(12) United States Patent
Yoshitomi (10) Patent No.: US 11,552,307 B2
(45) Date of Patent: Jan. 10, 2023

(54) FUEL CELL SYSTEM

(71) Applicant: HONDA MOTOR CO., LTD., Tokyo (JP)

(72) Inventor: Ryoichi Yoshitomi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 86 days.

(21) Appl. No.: 16/951,526

(22) Filed: Nov. 18, 2020

(65) Prior Publication Data

US 2021/0159517 A1    May 27, 2021

(30) Foreign Application Priority Data

Nov. 22, 2019   (JP) .............................. JP2019-211060

(51) Int. Cl.
| | |
|---|---|
| *H01M 8/0258* | (2016.01) |
| *H01M 8/04119* | (2016.01) |
| *H01M 8/2457* | (2016.01) |
| *H01M 8/2465* | (2016.01) |
| *H01M 8/04828* | (2016.01) |

(52) U.S. Cl.
CPC ..... *H01M 8/0258* (2013.01); *H01M 8/04141* (2013.01); *H01M 8/04835* (2013.01); *H01M 8/2457* (2016.02); *H01M 8/2465* (2013.01)

(58) Field of Classification Search
None
See application file for complete search history.

(56) References Cited

U.S. PATENT DOCUMENTS

| | | | | |
|---|---|---|---|---|
| 5,981,096 | A * | 11/1999 | Hornburg | H01M 8/0662 429/410 |
| 9,368,813 | B2 | 6/2016 | Kuwayama et al. | |
| 10,870,335 | B2 | 12/2020 | Lucas et al. | |
| 2001/0021468 | A1* | 9/2001 | Kanai | H01M 8/04156 429/414 |
| 2006/0086074 | A1* | 4/2006 | Kasuya | B01D 45/06 55/434 |

(Continued)

FOREIGN PATENT DOCUMENTS

| | | | |
|---|---|---|---|
| CN | 208460883 U | * | 2/2019 |
| CN | 208460883 U | * | 2/2019 |

(Continued)

OTHER PUBLICATIONS

Office Action dated Apr. 26, 2022 issued over the corresponding Japanese Patent Application No. 2019-211060 with the English translation thereof.

*Primary Examiner* — Haroon S. Sheikh
(74) *Attorney, Agent, or Firm* — Carrier, Shende & Associates, PC; Joseph P. Carrier; Fulchand P. Shende (57) ABSTRACT

A gas liquid separator of a fuel cell system includes a first channel forming section forming a first channel for allowing an oxygen-containing exhaust gas to flow in a horizontal direction, and a second channel forming section forming a second channel connected to the first channel. The first channel forming section is provided with an inlet for guiding the oxygen-containing exhaust gas into the first channel. The second channel forming section is provided with an outlet for discharging the oxygen-containing exhaust gas flowing through the second channel. The second channel includes a bent channel for guiding upward the oxygen-containing exhaust gas guided from the first channel.

11 Claims, 10 Drawing Sheets

(56) References Cited

U.S. PATENT DOCUMENTS

2020/0358113 A1    11/2020  Sazawa et al.
2021/0159522 A1     5/2021  Yoshitomi

FOREIGN PATENT DOCUMENTS

| | | | | | |
|---|---|---|---|---|---|
| CN | 110812875 | A | * | 2/2020 | ........... B01D 53/002 |
| CN | 110812875 | A | * | 2/2020 | |
| JP | 2003-178791 | A | | 6/2003 | |
| JP | 2007-026757 | A | | 2/2007 | |
| JP | 2007-134154 | A | | 5/2007 | |
| JP | 2007-184144 | A | | 7/2007 | |
| JP | 2010-055979 | A | | 3/2010 | |
| JP | 2014-154283 | A | | 8/2014 | |
| JP | 2016-051521 | A | | 4/2016 | |
| JP | 2019-503047 | A | | 1/2019 | |
| JP | 2020-161361 | A | | 10/2020 | |
| JP | 2020-184443 | A | | 11/2020 | |
| JP | 2021-082547 | A | | 5/2021 | |
| WO | 2013/183598 | A1 | | 12/2013 | |

* cited by examiner

⟶ OXYGEN-CONTAINING GAS
----▶ OXYGEN-CONTAINING EXHAUST GAS

→ OXYGEN-CONTAINING GAS
--→ OXYGEN-CONTAINING EXHAUST GAS

FUEL CELL SYSTEM

CROSS-REFERENCE TO RELATED APPLICATION

This application is based upon and claims the benefit of priority from Japanese Patent Application No. 2019-211060 filed on Nov. 22, 2019, the contents of which are incorporated herein by reference.

BACKGROUND OF THE INVENTION

Field of the Invention

The present invention relates to a fuel cell system.

Description of the Related Art

The fuel cell system includes a fuel cell stack formed by stacking a plurality of power generation cells. Each of the power generation cells performs power generation by electrochemical reactions of a fuel gas and an oxygen-containing gas. An oxygen-containing exhaust gas containing water produced in power generation of the power generation cells (oxygen-containing off gas) flows through the discharge channel provided in the fuel cell stack.

For example, Japanese Laid-Open Patent Publication No. 2007-184144 discloses structure where a gas liquid separator is provided in a discharge channel. The gas liquid separator separates water content from the oxygen-containing exhaust gas.

SUMMARY OF THE INVENTION

The present invention has been made in relation to the above described technique, and an object of the present invention is to provide a fuel cell system which makes it possible to effectively separate water content from an oxygen-containing exhaust gas.

According to an aspect of the present invention, provided is a fuel cell system including: a fuel cell stack comprising a plurality of power generation cells stacked together in a stacking direction, the power generation cells each being configured to perform power generation by electrochemical reactions of a fuel gas and an oxygen-containing gas; a supply channel configured to supply the oxygen-containing gas to the fuel cell stack; a discharge channel through which an oxygen-containing exhaust gas discharged from the fuel cell stack flows; and a gas liquid separator provided in the discharge channel and configured to perform gas liquid separation of the oxygen-containing exhaust gas. The gas liquid separator includes: a first channel configured to allow the oxygen-containing exhaust gas to flow in a horizontal direction; a second channel connected to the first channel; an inlet configured to guide the oxygen-containing exhaust gas into the first channel; and an outlet configured to discharge the oxygen-containing exhaust gas flowing through the second channel. The second channel includes a bent channel configured to guide upward the oxygen-containing exhaust gas guided from the first channel.

In the present invention, after the oxygen-containing exhaust gas is guided from the inlet of the gas liquid separator, the oxygen-containing exhaust gas flows through the first channel in the horizontal direction, and the flow direction of the oxygen-containing exhaust gas is changed to the upward direction by the bent channel of the second channel. At this time, the water content contained in the oxygen-containing exhaust gas is adhered to the wall surface forming the bent channel by the inertial force generated by the gas liquid specific gravity difference. Thus, it is possible to effectively separate the water content from the oxygen-containing exhaust gas.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Hereinafter, preferred embodiments of a fuel cell system according to the present invention will be described with reference to the accompanying drawings.

For example, a fuel cell system 10 according to an embodiment of the present invention is mounted in a fuel cell vehicle (fuel cell electric automobile). The fuel cell system 10 may be mounted in any of various moving objects other than the fuel cell vehicle. The fuel cell system 10 may be used in stationary applications.

Figure 1:
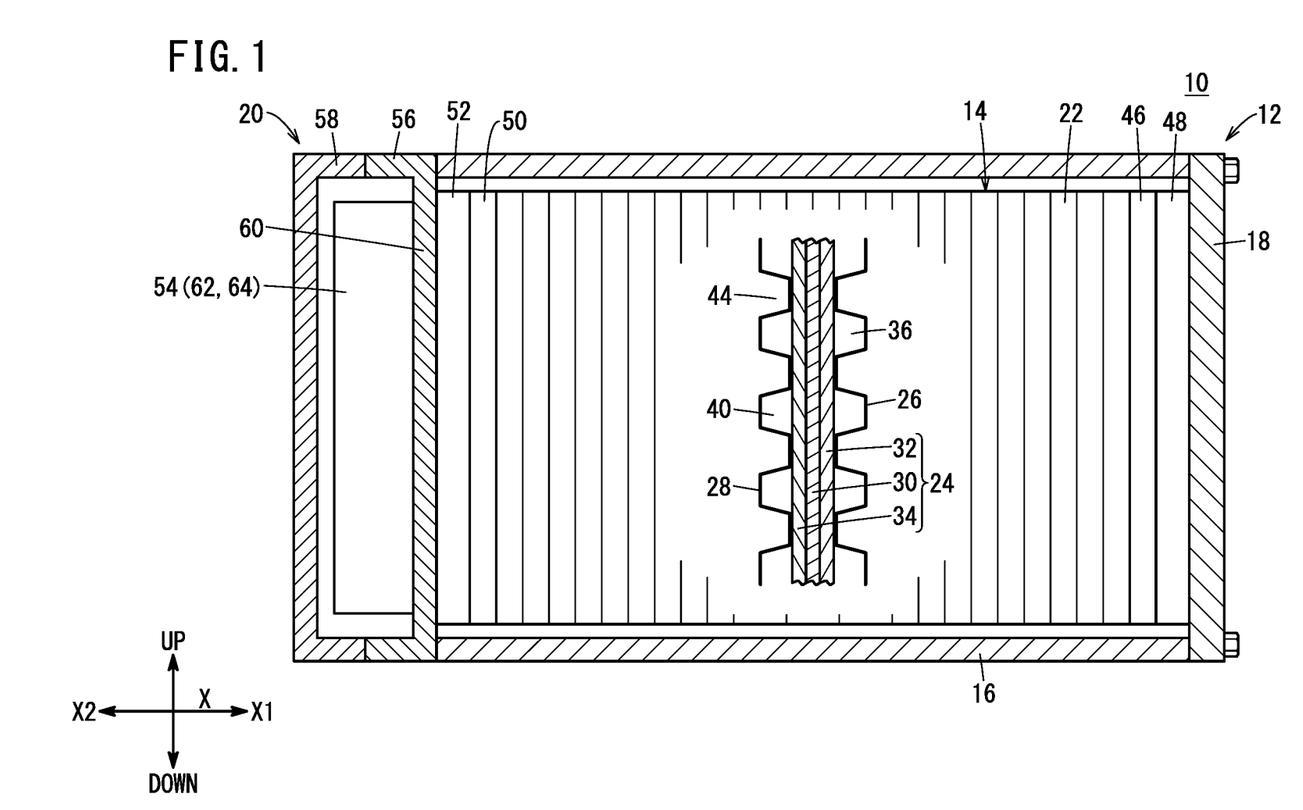
FIG. 1 is a view schematically showing structure of a fuel cell system according to an embodiment of the present invention.

As shown in FIG. 1, the fuel cell system 10 includes a fuel cell stack 12. The fuel cell stack 12 includes a cell stack body 14, a stack case 16, an end plate 18, and an auxiliary device case 20. The cell stack body 14 is formed by stacking a plurality of power generation cells 22 in one direction (indicated by an arrow X, horizontal direction).

The power generation cell 22 includes a membrane electrode assembly (hereinafter referred to as the "MEA 24"), and a pair of separators 26, 28 sandwiching the MEA 24 from both sides. For example, the MEA 24 includes an electrolyte membrane 30, an anode 32 provided on one surface of the electrolyte membrane 30, and a cathode 34 provided on the other surface of the electrolyte membrane 30. The electrolyte membrane 30 is a solid polymer electrolyte membrane (cation ion exchange membrane) of perfluorosulfonic acid containing water. A fluorine based electrolyte may be used as the electrolyte membrane 30. Alternatively, an HC (hydrocarbon) based electrolyte may be used as the electrolyte membrane 30.

Each of the separators 26, 28 is formed by press forming of a metal thin plate to have a corrugated shape in cross section and a wavy shape on the surface. For example, the metal plate is a steel plate, a stainless steel plate, an aluminum plate, a plated steel plate, or a metal plate having an anti-corrosive surface by surface treatment. As the separators 26, 28, instead of the metal separators, for example, carbon members may be used.

A fuel gas flow field 36 as a passage of a fuel gas (e.g., hydrogen gas) is formed on a surface of the separator 26 facing the anode 32. The fuel gas flow field 36 is connected to a fuel gas inlet 38a (see FIG. 2) and a fuel exhaust gas outlet 38b (see FIG. 2) of the fuel cell stack 12.

An oxygen-containing gas flow field 40 as a passage of an oxygen-containing gas (e.g., the air) is formed on a surface of the separator 28 facing the cathode 34. The oxygen-containing gas flow field 40 is connected to an oxygen-containing gas inlet 42a (see FIG. 2) and an oxygen-containing exhaust gas outlet 42b (see FIG. 2) of the fuel cell stack 12. A coolant flow field 44 as a passage of coolant is formed between the separators 26, 28.

A fuel gas is supplied to the anode 32. An oxygen-containing gas is supplied to the cathode 34. The power generation cell 22 performs power generation by electrochemical reactions of a fuel gas supplied to the anode 32 and an oxygen-containing gas supplied to the cathode 34.

At one end of the cell stack body 14 (end indicated by an arrow X1), a first terminal plate 46 is provided. A first insulating plate 48 is provided outside the first terminal plate 46, and the end plate 18 is provided outside the first insulating plate 48. At the other end of the cell stack body 14 (end indicated by an arrow X2), a second terminal plate 50 is provided. A second insulating plate 52 is provided outside the second terminal plate 50, and the auxiliary device case 20 is provided outside the second insulating plate 52.

The stack case 16 has a rectangular cylindrical shape extending in a direction indicated by an arrow X. The stack case 16 covers the cell stack body 14 in the direction perpendicular to the stacking direction. The end plate 18 is fixed to one end of the stack case 16 (end in the direction indicated by the arrow X1).

The auxiliary device case 20 is a protection case for protecting a fuel cell auxiliary device 54. The auxiliary device case 20 includes a recessed case body 56 fixed to the other end of the stack case 16 (end in the direction indicated by the arrow X2), and a cover 58 covering an opening of the case body 56 opened in the direction indicated by the arrow X2). The case body 56 includes an end plate section 60 which is positioned adjacent to the second insulating plate 52, and applies a tightening load to the cell stack body 14 between the end plate section 60 and the end plate 18. As the fuel cell auxiliary devices 54, a fuel gas system device 62 and an oxygen-containing gas system device 64 are accommodated in the auxiliary device case 20.

Figure 2:
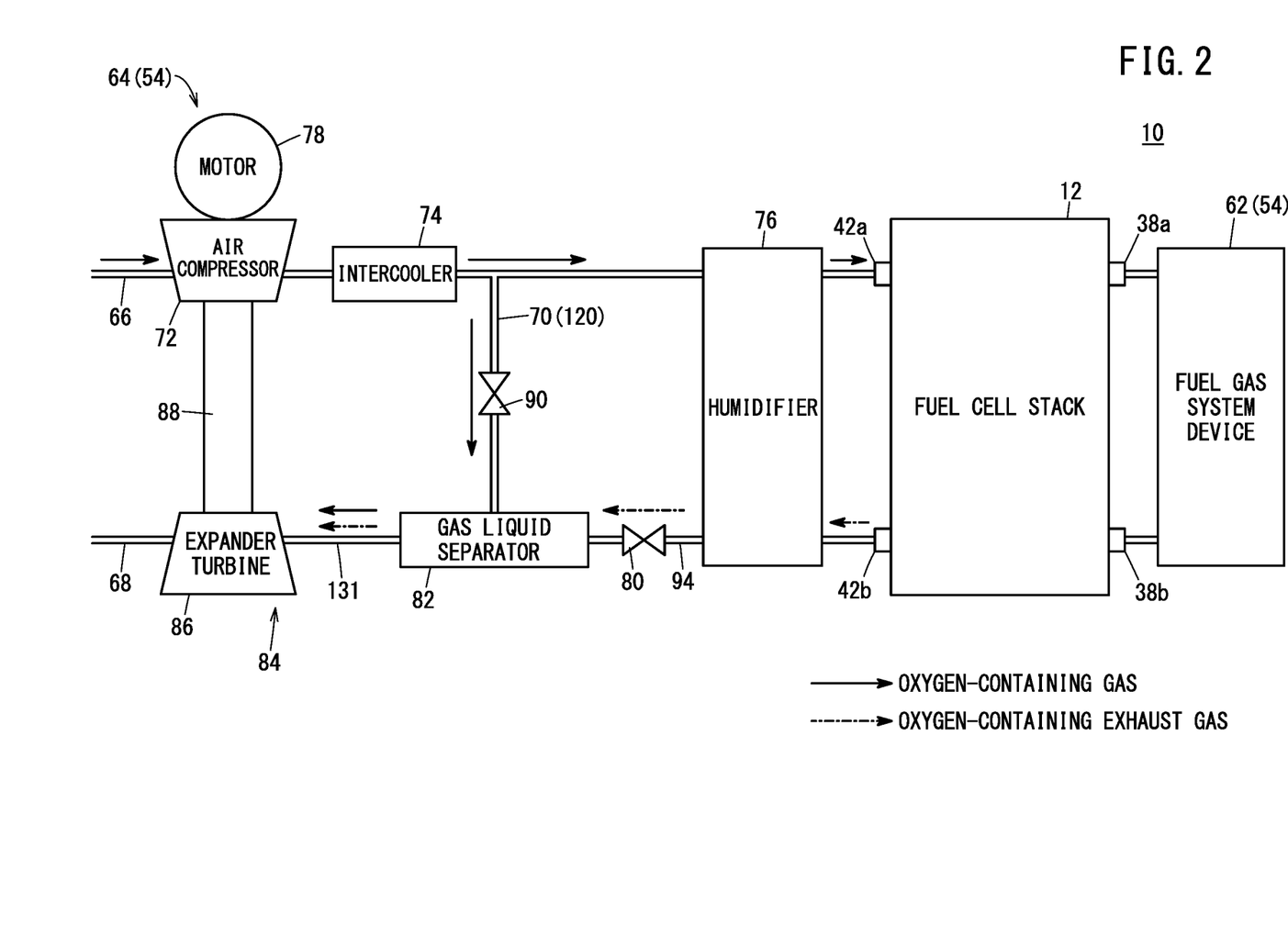
FIG. 2 is a block diagram showing the fuel cell system in FIG. 1.

As shown in FIG. 2, the fuel gas system device 62 supplies a fuel gas to the fuel cell stack 12. Although not shown, for example, the fuel gas system device 62 includes a hydrogen tank, an injector, an ejector, etc.

The oxygen-containing gas system device 64 includes a supply channel 66, a discharge channel 68, and a bypass channel 70. The supply channel 66 supplies the oxygen-containing gas to the fuel cell stack 12. An oxygen-containing exhaust gas discharged from the fuel cell stack 12 (oxygen-containing off gas) flows through the discharge channel 68. The bypass channel 70 guides, to the discharge channel 68, the oxygen-containing gas (dry gas) flowing through the supply channel 66 in a manner that the oxygen-containing gas bypasses the fuel cell stack 12.

The supply channel 66 is provided with an air compressor 72 (compression machine), an intercooler 74, and a humidifier 76, in this order from the upstream side to the downstream side. The air compressor 72 is driven by a motor 78. The intercooler 74 cools the compressed oxygen-containing gas. The intercooler 74 may be an air cooling intercooler or a water cooling intercooler.

The humidifier 76 is provided so as to stride the supply channel 66 and the discharge channel 68. The humidifier 76 humidifies the oxygen-containing gas flowing through the supply channel 66, by the oxygen-containing exhaust gas (oxygen-containing exhaust gas containing water produced in power generation reactions of the power generation cells 22) flowing through the discharge channel 68. Stated otherwise, the humidifier 76 exchanges water and the heat through a porous membrane between the oxygen-containing exhaust gas flowing through the discharge channel 68 and the oxygen-containing gas flowing through the supply channel 66.

The discharge channel 68 is provided with a back pressure valve 80, a gas liquid separator 82, and a regeneration apparatus 84 on the downstream side of the humidifier 76, in this order from the upstream side toward the downstream side. The back pressure valve 80 regulates the pressure of the oxygen-containing gas supplied to the oxygen-containing gas flow field 40 by regulating the opening degree of the discharge channel 68. The detailed description about the structure of the gas liquid separator 82 will be given later.

The regeneration apparatus 84 includes an expander turbine 86 provided for the discharge channel 68, and a shaft 88 for coupling the expander turbine 86 and the air compressor 72 together. The expander turbine 86 is rotated by the oxygen-containing exhaust gas guided from the gas liquid separator 82. The rotation energy of the expander turbine 86 is transmitted to the air compressor 72 through the shaft 88.

The bypass channel 70 couples a part of the supply channel 66 between the intercooler 74 and the humidifier 76 to the gas liquid separator 82. The bypass channel 70 is provided with a bypass valve 90 which opens/closes the bypass channel 70.

Figure 3:
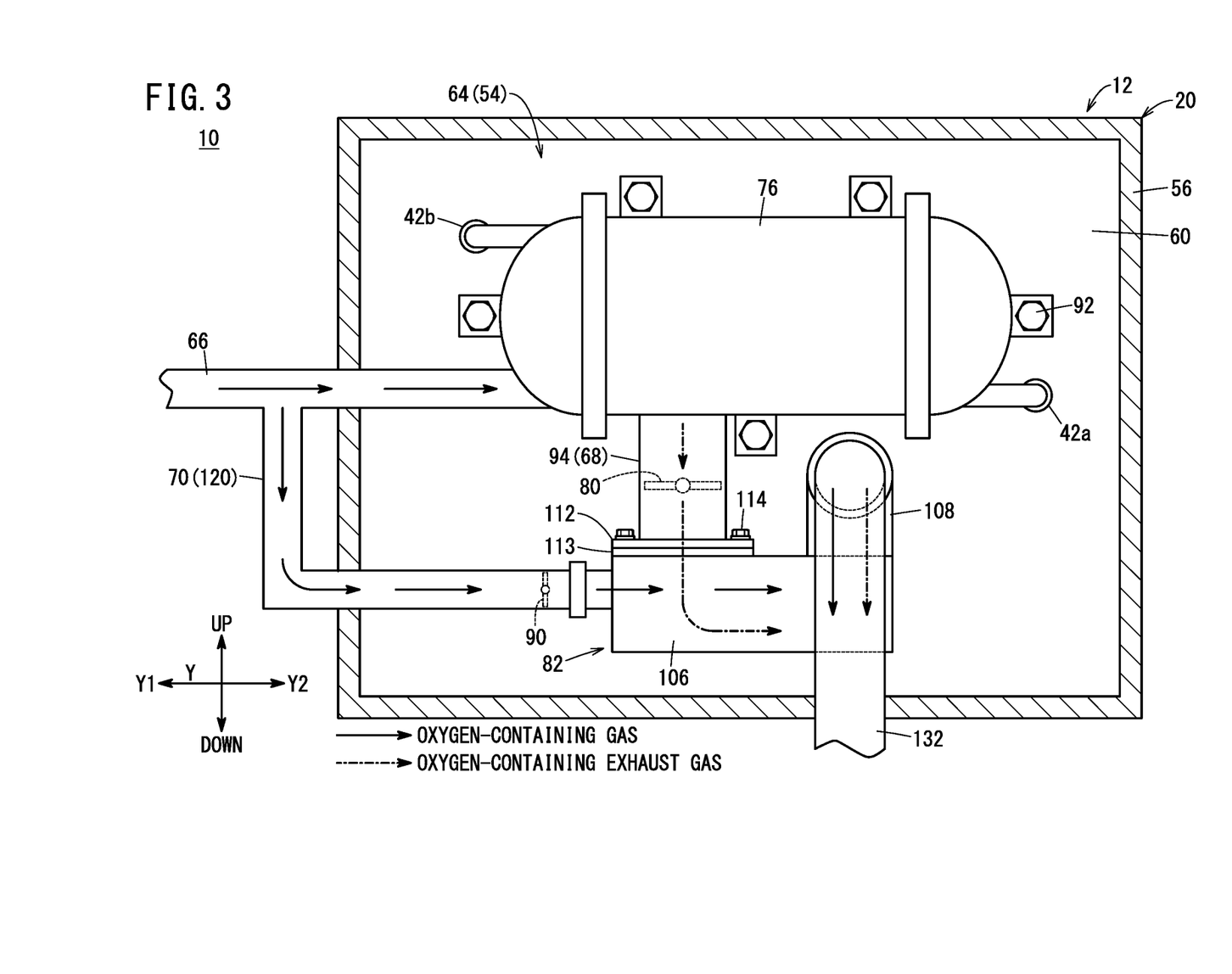
FIG. 3 is a view showing, with partial omission, an oxygen-containing gas system device in FIG. 2.

Next, the structure of the humidifier 76 and the gas liquid separator 82 will be described further in detail with reference to FIG. 3, etc. In FIG. 3, the fuel gas system device 62 is not shown.

As shown in FIG. 3, the humidifier 76 is provided in the auxiliary device case 20 (end of the fuel cell stack 12). Specifically, the humidifier 76 is fixed to the end plate section 60 of the case body 56 using tightening members 92 (e.g., a plurality of bolts). It should be noted that a method of fixing the humidifier 76 to the case body 56 can be changed as necessary.

The gas liquid separator 82 is positioned below the humidifier 76. The gas liquid separator 82 and the humidifier 76 are coupled together by a coupling pipe 94.

That is, the gas liquid separator 82 is mounted to the humidifier 76 through the coupling pipe 94. The gas liquid separator 82 is supported by the auxiliary device case 20 (end of the fuel cell stack 12) through the coupling pipe 94 and the humidifier 76. The coupling pipe 94 forms a portion of the discharge channel 68, between the humidifier 76 and the gas liquid separator 82.

The coupling pipe 94 extends downward from the humidifier 76 to the gas liquid separator 82. Stated otherwise, the coupling pipe 94 extends obliquely downward from the humidifier 76. Specifically, the coupling pipe 94 extends downward in a direction (indicated by the arrow X2) away from the end plate section 60 (see FIG. 7). The back pressure valve 80 is provided in the coupling pipe 94. The coupling pipe 94 guides the oxygen-containing exhaust gas discharged from the humidifier 76 toward the gas liquid separator 82.

Figure 4:
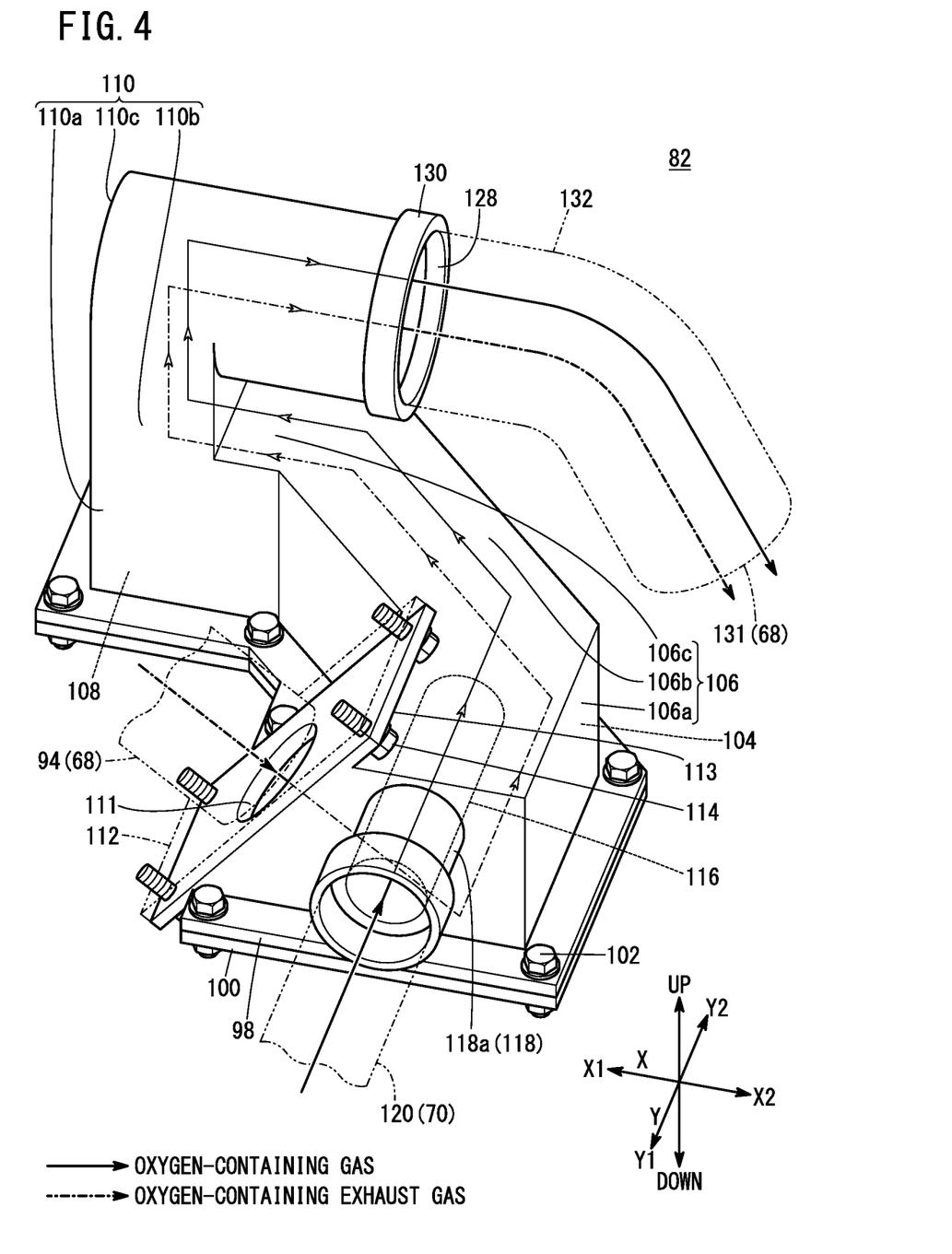
FIG. 4 is a perspective view showing a gas liquid separator in FIG. 3.

As shown in FIG. 4, the gas liquid separator 82 separates gas and liquid in the oxygen-containing exhaust gas, and can store the water content (liquid water) thus separated. The gas liquid separator 82 includes a base part 98 which is opened at the bottom, and a bottom wall 100 covering the opening of the base part 98 from below. The base part 98 and the bottom wall 100 are joined together using tightening members 102 (e.g., a plurality of bolts, see FIG. 5, etc.).

The gas liquid separator 82 includes a first channel forming section 106 forming a first channel 104 for allowing an oxygen-containing exhaust gas to flow in a horizontal direction (substantially in a horizontal direction) and a second channel forming section 110 forming a second channel 108 connected to the first channel 104.

As shown in FIGS. 4 to 7, the first channel forming section 106 extends from the side indicated by an arrow Y1 to the side indicated by an arrow Y2, and is bent in the direction indicated by the arrow X1. It should be noted that the first channel forming section 106 may not be bent, and may extend straight. The first channel forming section 106 includes a first section 106a, an intermediate section 106b, and a second section 106c. A bent portion is provided between the first section 106a and the intermediate section 106b, and another bent portion is provided between the intermediate section 106b and the second section 106c. That is, the first channel 104 includes bent portions (two bent portions) bent in the horizontal direction.

Figure 7:
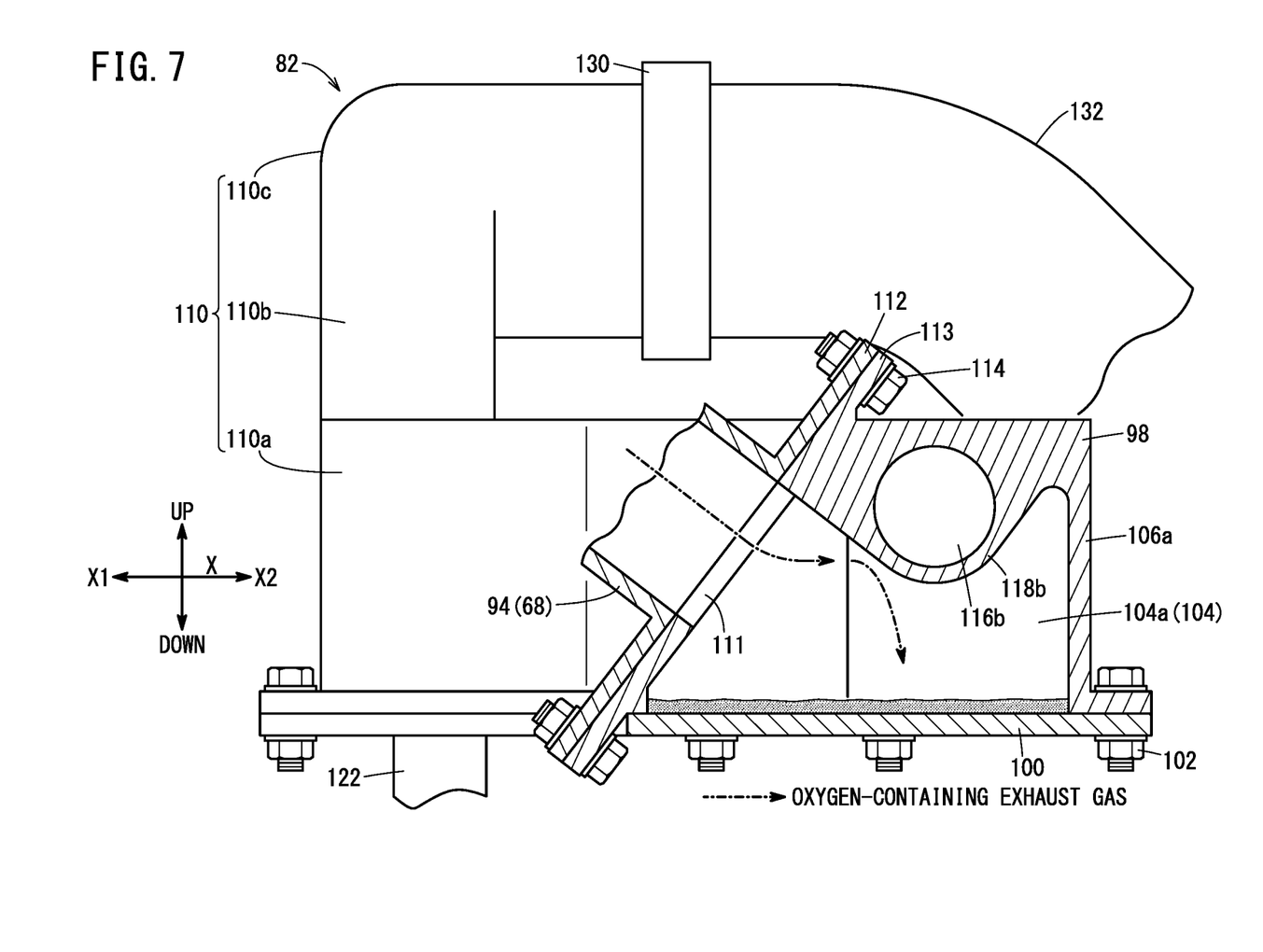
FIG. 7 is a cross sectional view taken along a line VII-VII in FIG. 5.

The first section 106a forms an internal first space 104a, and extends in the direction indicated by the arrow Y. In FIG. 7, an inlet 111 for guiding, into the first space 104a, the oxygen-containing exhaust gas guided from the humidifier 76 through the coupling pipe 94 is formed on a side wall of the first section 106a in the direction indicated by the arrow X1. The inlet 111 is oriented obliquely downward. Stated otherwise, the inlet 111 is oriented toward a wall surface forming the first space 104a.

As shown in FIG. 7, an inlet side connector 113, to which the coupling pipe 94 is connected, is provided at a position in the first section 106a on the outer peripheral side of the inlet 111. For example, the inlet side connector 113 is fixed to a flange section 112 of the coupling pipe 94 using tightening members 114 (e.g., a plurality of pairs of bolts and nuts).

Figure 5:
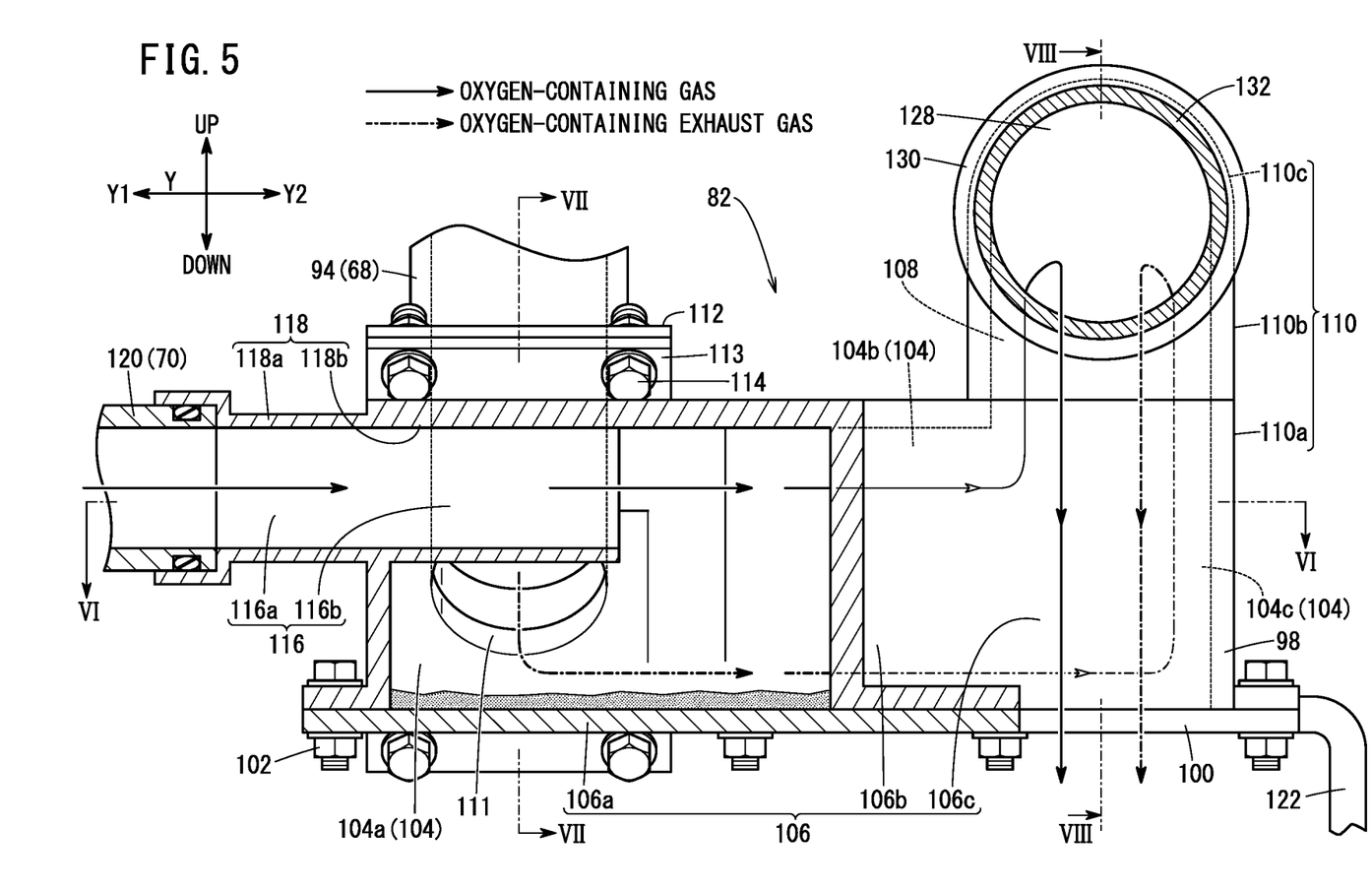
FIG. 5 is a cross sectional view showing the gas liquid separator in FIG. 4.
Figure 6:
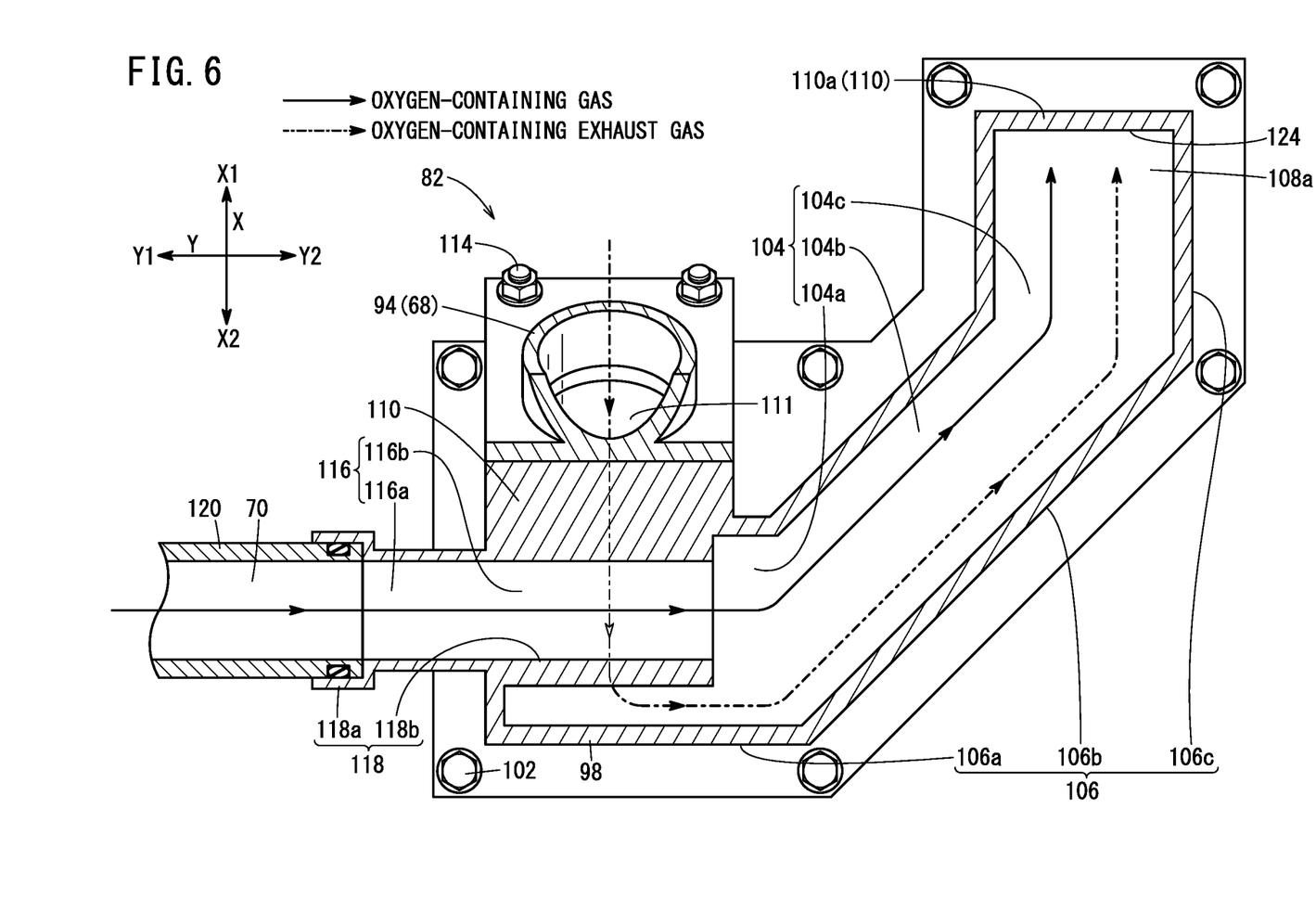
FIG. 6 is a cross sectional view taken along a line VI-VI in FIG. 5.

As shown in FIGS. 5 and 6, the first section 106a is provided with a gas inlet section 118 for forming a gas inlet channel 116. The gas inlet channel 116 guides the oxygen-containing gas (dry gas) guided from the bypass channel 70 toward the first channel 104 (upper part of the first space 104a). The gas inlet section 118 includes a bypass connector 118a and an inner protrusion 118b. The bypass connector 118a is a pipe-shaped portion extending from an end wall of the first section 106a in the direction indicated by the arrow Y1 (end wall of the base part 98 in the direction indicated by the arrow Y1) toward the side in the direction indicated by the arrow Y1.

An end of a bypass pipe 120 forming the bypass channel 70 is connected (fitted) to the bypass connector 118a. An inner hole 116a of the bypass connector 118a is connected to the bypass channel 70. The bypass connector 118a may have any structure as long as the bypass pipe 120 can be connected to the bypass connector 118a.

The inner protrusion 118b protrudes in the upper part (upper space) of the first space 104a, from an end of the bypass connector 118a in the direction indicated by the arrow Y2 toward the side in the direction indicated by the arrow Y2. A through hole 116b connected to the inner hole 116a of the bypass connector 118a is formed in the inner protrusion 118b. The through hole 116b of the inner protrusion 118b is opened toward the side indicated by the arrow Y2. Then inner surface forming the through hole 116b of the inner protrusion 118b and the inner surface forming the inner hole 116a of the bypass connector 118a are coupled together smoothly without any steps.

The protruding end of the inner protrusion 118b is positioned further to the side indicated by the arrow Y2 than the inlet 111. The upper part of the inner protrusion 118b is coupled to the upper wall of the first section 106a. A lower end of the inner protrusion 118b is positioned below an upper end of the inlet 111. A gap is formed between the lower end of the inner protrusion 118b and the bottom wall 100. The oxygen-containing exhaust gas flows from the inlet 111 into the gap (see FIG. 7).

As shown in FIG. 6, the intermediate section 106b forms an internal connection space 104b, and extends with inclination in the direction indicated by the arrow X1, from the other end of the first section 106a (end in the direction indicated by the arrow Y2) toward the side in the direction indicated by the arrow Y2. The connection space 104b is connected to the first space 104a.

The second section 106c forms an internal second space 104c, and extends from an extended end of the intermediate section 106b in the direction indicated by the arrow X1. The second space 104c is connected to the connection space 104b. A drain pipe 122 for discharging the water content stored in the gas liquid separator 82 to the outside is connected to a bottom of the second section 106c (bottom wall 100) (see FIGS. 5 and 8). An opening (connector) of the drain pipe 122 adjacent to the gas liquid separator 82 is positioned below the liquid surface of the stored water in the gas liquid separator 82. The opening (connector) of the drain pipe 122 adjacent to the gas liquid separator 82 is positioned below the second channel 108. The first space 104a, the connection space 104b, and the second space 104c form the first channel 104.

Figure 8:
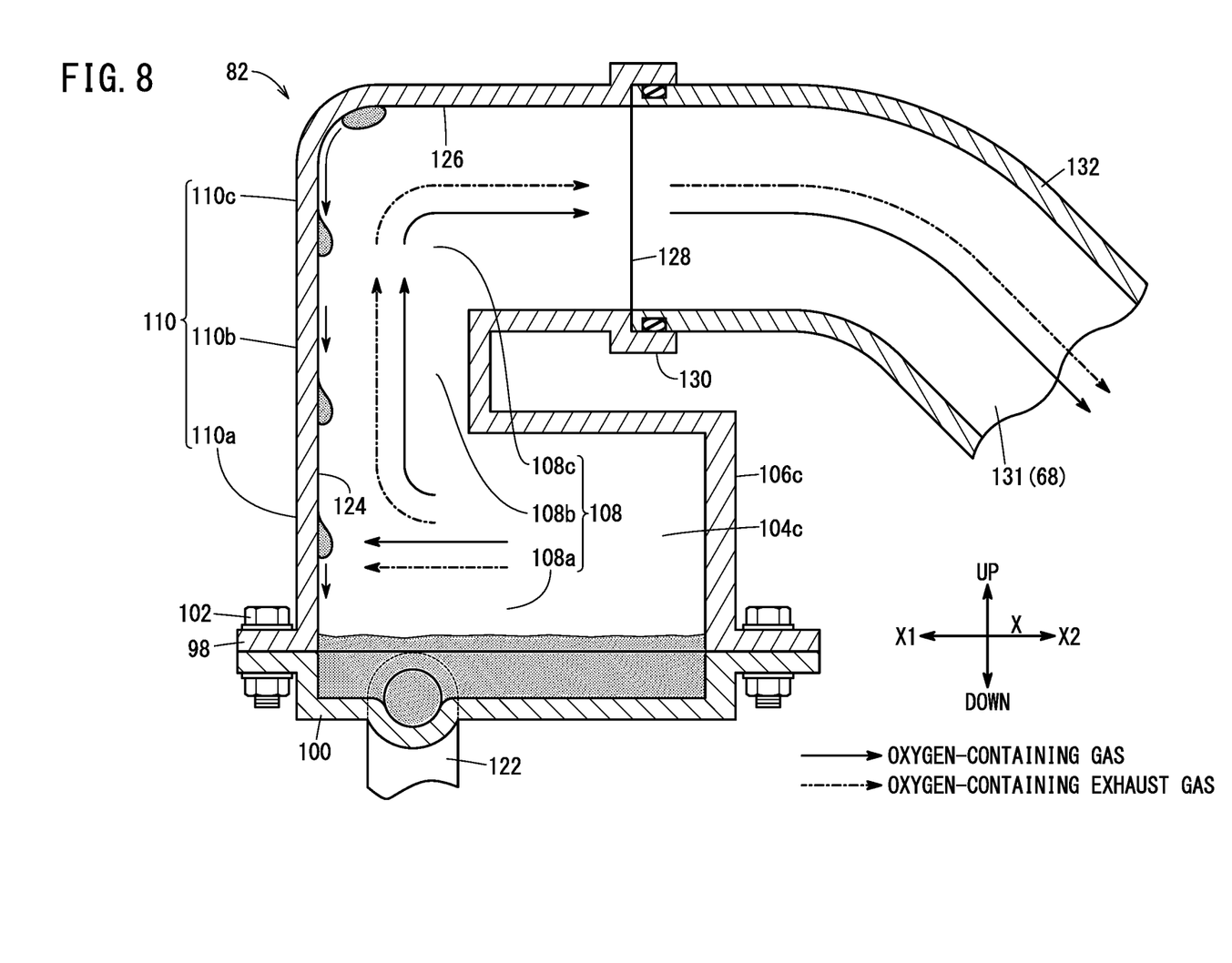
FIG. 8 is a cross sectional view taken along a line VIII-VIII in FIG. 5.

In FIG. 8, the cross sectional area of the second channel 108 is larger than the cross sectional area of the first channel 104. The second channel forming section 110 includes a first bent portion 110a bent upward at a right angle (substantially right angle) from the second section 106c, an upward extension 110b extending upward from the first bent portion 110a, and a second bent portion 110c bent at a right angle (substantially right angle) from an upper end of the upward extension 110b toward the side in the direction indicated by the arrow X2.

The first bent portion 110a forms an internal first bent channel 108a. The first bent channel 108a guides, toward the upper side, the oxygen-containing exhaust gas guided from the first channel 104. Stated otherwise, the first bent channel 108a changes the flow of the oxygen-containing exhaust gas from the horizontal direction to the upward direction. The first bent portion 110a includes a first separation wall 124 positioned at an end of the first bent potion 110a in the direction indicated by the arrow X1. The oxygen-containing exhaust gas guided from the second space 104c impinges upon the first separation wall 124. The first separation wall 124 extends in the vertical direction.

The upward extension 110b forms an internal upward flow channel 108b. The upward flow channel 108b allows the oxygen-containing exhaust gas guided from the first bent channel 108a to flow upward. The upward extension 110b extends in the upper/lower direction (vertical direction).

The second bent portion 110c forms an internal second bent channel 108c. The second bent channel 108c guides, in the horizontal direction (direction indicated by the arrow X2), the oxygen-containing exhaust gas guided from the upward flow channel 108b. Stated otherwise, the second bent channel 108c changes the flow of the oxygen-containing exhaust gas from the upward direction to the horizontal direction. The second bent portion 110c includes a second separation wall 126 positioned at an upper end of the second bent portion 110c. The oxygen-containing exhaust gas guided from the upward flow channel 108b impinges upon the second separation wall 126. The second separation wall 126 extends in the horizontal direction.

The bent angle of the first bent portion 110a is not limited to the right angle, and may be changed as necessary. It is sufficient that the first bent portion 110a is bent upward from the second section 106c. The bent angle of the second bent portion 110c is not limited to the right angle, and may be changed as necessary. It is sufficient that the second bent portion 110c is bent in the direction indicated by the arrow X2 from the upper end of the upward extension 110b.

An outlet 128 opened toward the side in the direction indicated by the arrow X2 is formed in the second bent portion 110c. That is, the outlet 128 is positioned above the inlet 111 (see FIG. 4). The second bent portion 110c is provided with a pipe-shaped outlet side connector 130.

An end of an outlet pipe 132 forming an outlet channel 131 is connected (fitted) to the outlet side connector 130. The outlet side connector 130 may have any structure as long as the outlet pipe 132 can be connected to the outlet side connector 130. The outlet channel 131 forms a part of the discharge channel 68, between the gas liquid separator 82 and the expander turbine 86 (see FIG. 2). The outlet channel 131 extends downward toward the downstream side.

Next, operation of the fuel cell system 10 will be described.

In FIG. 2, a fuel gas is supplied from the fuel gas system device 62 to the fuel gas inlet 38a of the fuel cell stack 12. The fuel gas supplied to the fuel gas inlet 38a flows into the fuel gas flow field 36 of each power generation cell 22, and supplied to the anode 32 (see FIG. 1).

The oxygen-containing gas is supplied from the supply channel 66 to the oxygen-containing gas inlet 42a of the fuel cell stack 12 through the air compressor 72, the intercooler 74, and the humidifier 76. The oxygen-containing gas supplied to the oxygen-containing gas inlet 42a flows into the oxygen-containing gas flow field 40 of each power generation cell 22, and is supplied to the cathode 34 (see FIG. 1).

Thus, in FIG. 1, in each of the MEA 24, the fuel gas supplied to the anode 32 and the oxygen in the oxygen-containing gas supplied to the cathode 34 are consumed in the electrochemical reactions in the electrode catalyst layers. At this time, water is produced at the cathode 34.

As shown in FIG. 2, after the fuel gas is supplied to the anode 32 and partially consumed at the anode 32, the fuel gas is discharged as the fuel exhaust gas into the fuel exhaust gas outlet 38b of the fuel cell stack 12. After the oxygen-containing gas is supplied to the cathode 34 and partially consumed at the cathode 34, the oxygen-containing gas is discharged as the oxygen-containing exhaust gas containing the produced water into the oxygen-containing exhaust gas outlet 42b.

The oxygen-containing exhaust gas discharged into the oxygen-containing exhaust gas outlet 42b flows through the discharge channel 68, and flows into the humidifier 76. Further, in the humidifier 76, the water content and the heat are exchanged between the oxygen-containing exhaust gas flowing through the discharge channel 68 and the oxygen-containing gas flowing through the supply channel 66. That is, the oxygen-containing gas is humidified and heated by the oxygen-containing exhaust gas.

As shown in FIGS. 3, 4, and 7, the oxygen-containing exhaust gas discharged from the humidifier 76 flows from the inlet 111 of the gas liquid separator 82 into the first space 104a (first channel 104) through the coupling pipe 94. At this time, the oxygen-containing exhaust gas, which flowed from the inlet 111 into the first space 104a, impinges upon the inner protrusion 118b, whereby the flow direction of the oxygen-containing exhaust gas is changed to the downward direction (see FIG. 7). Stated otherwise, the inner protrusion 118b forms a downward flow of the oxygen-containing exhaust gas which flowed from the inlet 111 into the first space 104a.

Therefore, the water content contained in the oxygen-containing exhaust gas is adhered to the outer surface of the inner protrusion 118b by the inertial force generated by the gas liquid specific gravity difference. The water content adhered to the outer surface of the inner protrusion 118b flows downward by the oxygen-containing exhaust gas, and is stored at the bottom of the gas liquid separator 82.

As shown in FIG. 6, the oxygen-containing exhaust gas guided from the inlet 111 is guided into the first bent channel 108a through the first space 104a, the connection space 104b, and the second space 104c. Then, as shown in FIG. 8, the oxygen-containing exhaust gas guided into the first bent channel 108a impinges upon the first separation wall 124 of the first bent portion 110a, whereby the flow direction of the oxygen-containing exhaust gas is changed to the upward direction. At this time, the water content contained in the oxygen-containing exhaust gas is adhered to the first separation wall 124 by the inertial force generated by the gas liquid specific gravity difference. The water content adhered to the first separation wall 124 flows downward by action of the gravity, and is stored at the bottom of the gas liquid separator 82.

After the oxygen-containing exhaust gas flows upward through the first bent channel 108a, the oxygen-containing exhaust gas is guided into the second bent channel 108c through the upward flow channel 108b, and impinges upon the second separation wall 126 of the second bent portion 110c. Thus, the flowing direction of the oxygen-containing exhaust gas is changed toward the direction indicated by the arrow X2. At this time, the water content contained in the oxygen-containing exhaust gas is adhered to the second separation wall 126 by the inertial force generated by the gas liquid specific gravity difference. The water content adhered to the second separation wall 126 is transmitted along the inner surface of the upward extension 110b and the first bent portion 110a by action of the gravity, and is stored at the bottom of the gas liquid separator 82.

Further, since the cross sectional area of the second channel 108 is larger than the cross sectional area of the first channel 104, when the oxygen-containing exhaust gas is guided from the first channel 104 into the second channel 108, the flow rate of the oxygen-containing exhaust gas is decreased. Therefore, it becomes difficult for the oxygen-containing exhaust gas flowing upward through the second channel 108 to lift the liquid water (stored water) stored at the bottom of the gas liquid separator 82. That is, it is possible to effectively reduce or eliminate the situations where the stored water rides over the second channel forming section 110 together with the oxygen-containing exhaust gas, and flows toward the downstream side of the gas liquid separator 82.

After the oxygen-containing exhaust gas flows through the second bent channel 108c in the direction indicated by the arrow X2, the oxygen-containing exhaust gas is discharged from the outlet 128, flows downward through the outlet channel 131, and is then guided into the expander turbine 86. Since the water content is removed sufficiently by the gas liquid separator 82 from the oxygen-containing exhaust gas guided into the expander turbine 86, it is possible to eliminate or reduce the situations where the water content is adhered to the expander turbine 86. That is, it is possible to avoid problems where the rotation efficiency (regeneration efficiency) of the expander turbine 86 is decreased by the water content, the expander turbine 86 is rusted due to the water, and the expander turbine 86 cannot be operated due to freezing of the water content.

On the other hand, for example, at the time of stopping power generation of the fuel cell stack 12, the bypass channel 70 is opened by the bypass valve 90. In this case, as shown in FIG. 2, the oxygen-containing gas flowing through the supply channel 66 is guided into the gas inlet channel 116 (see FIGS. 5 and 6) of the gas liquid separator 82 through the bypass channel 70.

In FIG. 5, the oxygen-containing gas guided into the gas inlet channel 116 flows through the upper space of the first channel 104, and is then guided into the second channel 108. That is, the oxygen-containing gas guided from the bypass channel 70 flows through the upper space of the first channel 104, and the oxygen-containing exhaust gas guided from the inlet 111 flows through the lower space of the first channel 104. Therefore, it is possible to eliminate or reduce the situations where the oxygen-containing gas and the oxygen-containing exhaust gas are mixed together. The water content ratio of the oxygen-containing gas is lower than the water content ratio of the oxygen-containing exhaust gas. Therefore, it is possible to suppress the flow of the water content into the expander turbine 86.

In this case, the fuel cell system 10 according to the embodiment of the present invention offers the following advantages.

The gas liquid separator 82 of the fuel cell system 10 includes the first channel 104 for allowing the oxygen-containing exhaust gas to flow in the horizontal direction, the second channel 108 connected to the first channel 104, the inlet 111 for guiding the oxygen-containing exhaust gas into the first channel 104, and the outlet 128 for discharging the oxygen-containing exhaust gas flowing through the second channel 108. The second channel 108 includes the first bent channel 108a for guiding upward the oxygen-containing exhaust gas guided from the first channel 104.

In the structure, the oxygen-containing exhaust gas guided from the inlet 111 of the gas liquid separator 82 flows through the first channel 104 of the first channel forming section 106 in the horizontal direction, and thereafter, the flow direction of the oxygen-containing exhaust gas is changed to the upward direction by the first bent channel 108a of the second channel 108. At this time, the water content contained in the oxygen-containing exhaust gas is adhered to the first separation wall 124 forming the first bent channel 108a by the inertial force generated by the gas liquid specific gravity difference. In this manner, it is possible to separate the water content from the oxygen-containing exhaust gas effectively.

The first bent channel 108a is bent at a right angle.

In the structure, it is possible to separate the water content from the oxygen-containing exhaust gas more effectively.

The second channel 108 includes the upward flow channel 108b for allowing the oxygen-containing exhaust gas guided from the first bent channel 108a to flow upward, and the second bent channel 108c for guiding, in the horizontal direction (substantially in the horizontal direction), the oxygen-containing exhaust gas guided from the upward flow channel 108b.

In the structure, after the oxygen-containing exhaust gas guided from the first bent channel 108a flows upward through the upward flow channel 108b, the flow direction of the oxygen-containing exhaust gas is changed to the horizontal direction (substantially in the horizontal direction) by the second bent channel 108c. At this time, the water content contained in the oxygen-containing exhaust gas is adhered to the second separation wall 126 forming the second bent channel 108c by the inertial force generated by the gas liquid specific gravity difference. Accordingly, it is possible to separate the water content from the oxygen-containing exhaust gas more effectively.

The second bent channel 108c is bent at a right angle.

In the structure, it is possible to separate the water content from the oxygen-containing exhaust gas more effectively.

The gas liquid separator 82 is supported at an end of the fuel cell stack 12 (auxiliary device case 20) in the stacking direction of the plurality of power generation cells 22.

In the structure, it is possible to achieve the compact structure of the fuel cell system 10.

The fuel cell system 10 includes the humidifier 76 configured to humidify the oxygen-containing gas flowing through the supply channel 66, by the oxygen-containing exhaust gas flowing through the discharge channel 68, and the coupling pipe 94 configured to couple the humidifier 76 and the gas liquid separator 82 together and guide, to the inlet 111, the oxygen-containing exhaust gas discharged from the humidifier 76. The humidifier 76 is provided at the end of the fuel cell stack 12 (auxiliary device case 20), and the gas liquid separator 82 is mounted to the humidifier 76 through the coupling pipe 94.

In the structure, it is possible to achieve the further compact structure of the fuel cell system 10.

The fuel cell system 10 includes the bypass channel 70 for guiding, to the first channel 104, at least part of the oxygen-containing gas flowing through the supply channel 66.

In the structure, since the oxygen-containing gas having the water content ratio which is lower than that of the oxygen-containing exhaust gas is guided from the bypass channel 70 to the first channel 104, it is possible to effectively reduce the quantity of the water content guided toward the downstream side of the gas liquid separator 82.

The inlet 111 is oriented toward the wall forming the first channel 104.

In the structure, the oxygen-containing exhaust gas which flowed from the inlet 111 into the first channel 104 impinges upon the wall forming the first channel 104. Therefore, it is possible to adhere the water content contained in the oxygen-containing exhaust gas to the wall.

The regeneration apparatus 84 for regenerating energy of the oxygen-containing exhaust gas is provided in the discharge channel 68 on the downstream side of the gas liquid separator 82.

In the structure, it is possible to suppress entry of the water content into the regeneration apparatus 84.

The cross sectional area of the second channel 108 is larger than the cross sectional area of the first channel 104.

In the structure, since it is possible to decrease the flow rate of the oxygen-containing exhaust gas flowing through the second channel 108, it becomes difficult to lift liquid (stored water) stored at the bottom of the gas liquid separator 82. Thus, it is possible to effectively eliminate or reduce the situations where the stored water and the oxygen-containing exhaust gas flow toward the downstream side of the gas liquid separator 82.

The first bent portion 110*a* forming the first bent channel 108*a* includes the first separation wall 124 upon which the oxygen-containing exhaust gas guided from the first channel 104 impinges. The first separation wall 124 extends in a vertical direction.

In the structure, it is possible to efficiently adhere, to the first separation wall 124, the water content contained in the oxygen-containing exhaust gas guided from the first channel 104.

The second bent portion 110*c* forming the second bent channel 108*c* includes a second separation wall 126 upon which the oxygen-containing exhaust gas guided from the upward flow channel 108*b* impinges. The second separation wall 126 extends in a horizontal direction.

In the structure, it is possible to adhere, to the second separation wall 126, the water content contained in the oxygen-containing exhaust gas guided from the upward flow channel 108*b*.

The first channel 104 includes a bent portion bent in a horizontal direction.

In the structure, it is possible to separate the water content from the oxygen-containing exhaust gas by the bent portion of the first channel 104.

The present invention is not limited to the above described embodiments. Various modifications can be made without departing from the gist of the present invention.

Figure 9A:
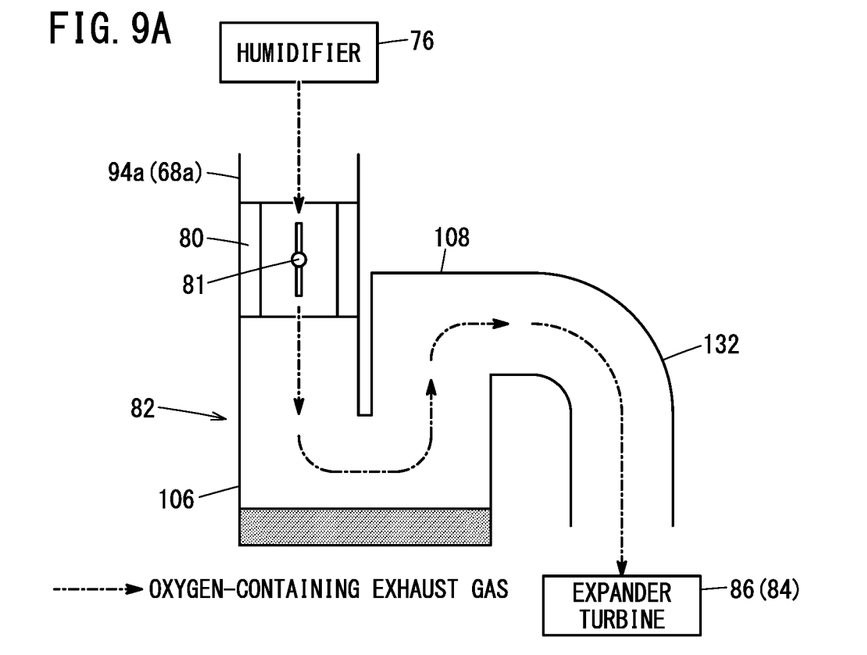
FIG. 9A is a view schematically showing a coupling pipe and a gas liquid separator according to a first modified embodiment.

As shown FIG. 9A, instead of the coupling pipe 94 (discharge channel 68), a coupling pipe 94*a* (discharge channel 68*a*) may be coupled to the gas liquid separator 82. The coupling pipe 94*a* extends in the vertical direction. The coupling pipe 94*a* is coupled to the upper part of the first channel forming section 106 of the gas liquid separator 82. That is, after the oxygen-containing exhaust gas flows from the humidifier 76 vertically downward in the coupling pipe 94*a*, the oxygen-containing exhaust gas flows from a vertically upper position into the gas liquid separator 82.

The back pressure valve 80 is provided in the coupling pipe 94*a*. For example, the back pressure valve 80 is a butterfly valve. The back pressure valve 80 closes a discharge channel 68*a* in the state where a valve plug 81 extends in the horizontal direction, and opens the discharge channel 68*a* in the state where the valve plug 81 is inclined from the horizontal direction (e.g., in the state where the valve plug 81 extends in the vertical direction). In the modified embodiment, water droplets adhered to the coupling pipe 94*a* and the back pressure valve 80 are collected efficiently into the gas liquid separator 82 by the downward flow of the oxygen-containing exhaust gas.

Figure 9B:
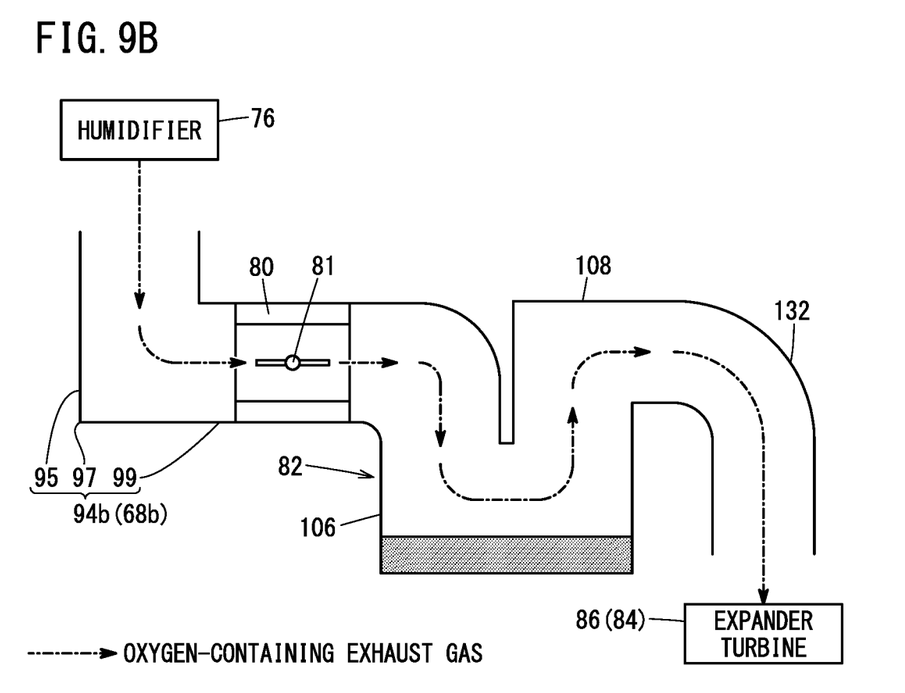
FIG. 9B is a view schematically showing a coupling pipe and a gas liquid separator according to a second modified embodiment.

As shown in FIG. 9B, instead of the coupling pipe 94 (discharge channel 68), a coupling pipe 94*b* (discharge channel 68*b*) may be coupled to the gas liquid separator 82. The coupling pipe 94*b* includes a first pipe 95 extending vertically downward from the humidifier 76, and a second pipe 99 extending horizontally from a lower end of the first pipe 95 through a bent portion 97. The second pipe 99 is coupled to the upper part of the side surface of the gas liquid separator 82.

The coupling portion of the second pipe 99 coupled to the gas liquid separator 82 is provided at a position higher than (above) the liquid surface of the stored water in the gas liquid separator 82. Therefore, even if the vehicle is inclined, it is possible to eliminate or reduce the situations where the stored water in the gas liquid separator 82 flows into the second pipe 99. The oxygen-containing exhaust gas which flowed vertically downward from the humidifier 76 inside the first pipe 95 flows through the bent portion 97 and flows in the horizontal direction inside the second pipe 99, and then, flows into the gas liquid separator 82 in the horizontal direction.

The back pressure valve 80 is provided inside the second pipe 99. For example, the back pressure valve 80 is a butterfly valve. The back pressure valve 80 closes the discharge channel 68*b* in the state where the valve plug 81 extends in the vertical direction, and opens the discharge channel 68*b* in the state where the valve plug 81 is inclined from the vertical direction (e.g., in the state where the valve plug 81 extends in the horizontal direction). In the modified embodiment, water droplets adhered to the coupling pipe 94*b* and the back pressure valve 80 are collected into the gas liquid separator 82 by the oxygen-containing exhaust gas.

Figure 10:
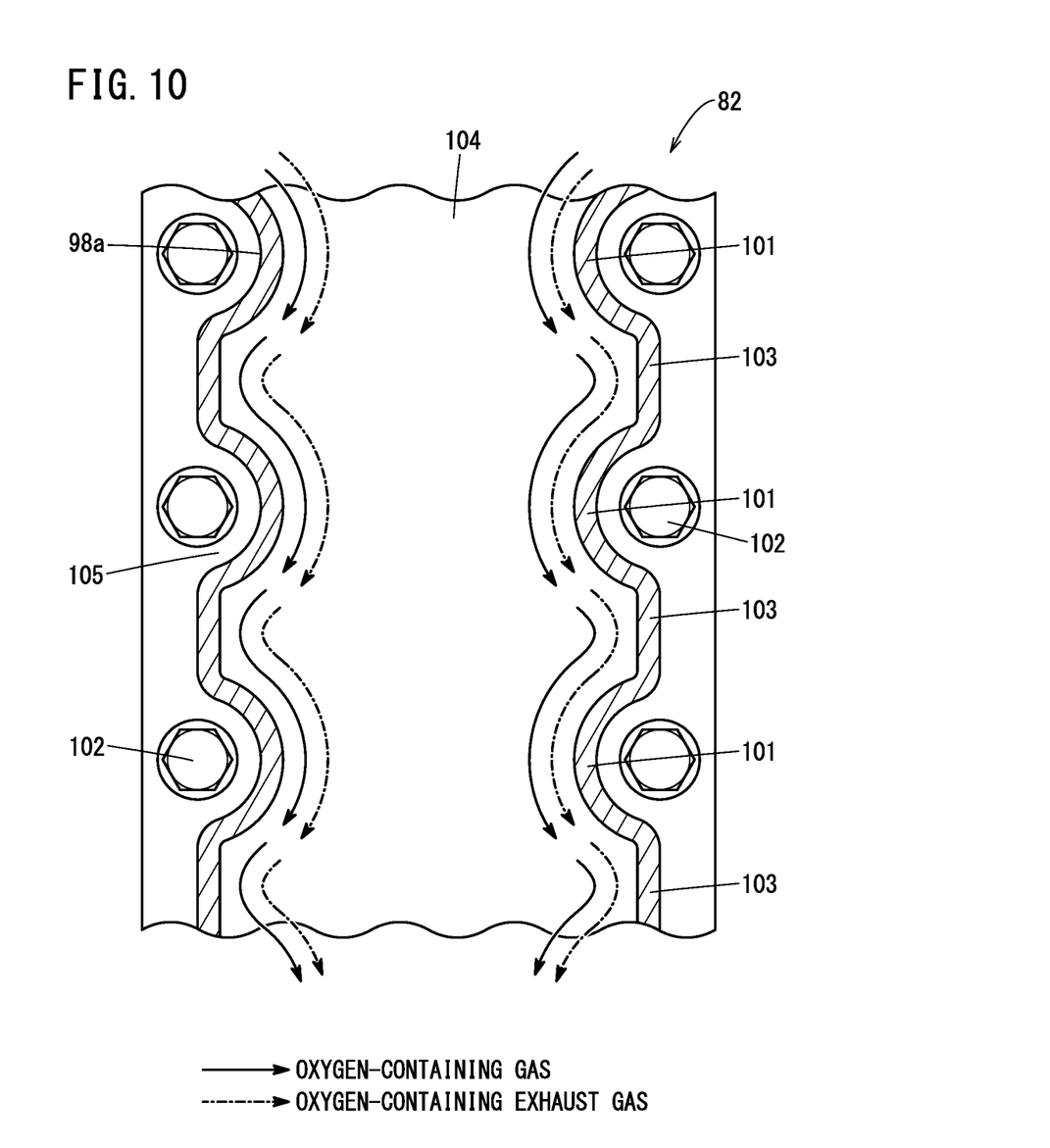
FIG. 10 is a cross sectional view showing, with partial omission, a base part according to a modified embodiment.

As shown in FIG. 10, the gas liquid separator 82 may include a base part 98*a* instead of the base part 98. A plurality of channel contraction portions 101 and a plurality of channel expansion portions 103 are provided in portions of the base part 98*a* that form the first channel 104. The channel contraction portions 101 and the channel expansion portions 103 are provided alternately in the flow direction of the oxygen-containing gas and the oxygen-containing exhaust gas in the first channel 104.

The cross sectional area (channel width) of the channel contraction portion 101 is smaller (narrower) than the cross sectional area (channel width) of the channel expansion portion 103. The channel width herein means the width of the first channel 104 in the horizontal direction. Recesses 105, in which the tightening members 102 can be respectively disposed, are formed by the channel contraction portions 101 and the channel expansion portions 103 on the outer surface of the base part 98*a*. The base part 98*a* having the above structure is more advantageous than the base part 98 as described above.

The connection position of the bypass pipe 120 connected to the gas liquid separator 82 may be changed as necessary as long as the connection position is on the downstream side of the backpressure valve 80, and on the upstream side of the expander turbine 86. That is, for example, the bypass pipe 120 may be connected to the second channel forming section 110 (e.g., the upward extension 110*b* or the second bent portion 110*c*, etc.), and may be connected to the outlet pipe 132.

The above embodiment can be summarized as follows.

The embodiment discloses the fuel cell system (10) including the fuel cell stack (12) formed by stacking a plurality of power generation cells (22) together, the supply channel (66), the discharge channel (68, 68*a*, 68*b*), and the gas liquid separator (82). Each of the power generation cells is configured to perform power generation by electrochemical reactions of a fuel gas and an oxygen-containing gas. The supply channel supplies the oxygen-containing gas to the fuel cell stack. The oxygen-containing exhaust gas discharged from the fuel cell stack flows through the discharge channel. The gas liquid separator is provided in the discharge channel and performs gas liquid separation of the oxygen-containing exhaust gas. The gas liquid separator includes the first channel (104) for allowing the oxygen-containing exhaust gas to flow in the horizontal direction, the second channel (108) connected to the first channel, the inlet (111) for guiding the oxygen-containing exhaust gas into the first channel, and the outlet (128) for discharging the oxygen-containing exhaust gas flowing through the second channel. The second channel includes the bent channel (108a) configured to guide upward the oxygen-containing exhaust gas guided from the first channel.

In the fuel cell system, the bent channel may be bent at a right angle.

In the fuel cell system, the bent channel is the first bent channel (108a), and the second channel may include the upward flow channel (108b) for allowing the oxygen-containing exhaust gas guided from the first bent channel to flow upward, and the second bent channel (108c) for guiding, in the horizontal direction, the oxygen-containing exhaust gas guided from the upward flow channel.

In the fuel cell system, the second bent channel may be bent at a right angle.

In the fuel cell system, the gas liquid separator may be supported at the end (20) of the fuel cell stack in the stacking direction of the plurality of power generation cells.

The fuel cell system may include the humidifier (76) configured to humidify the oxygen-containing gas flowing through the supply channel, by the oxygen-containing exhaust gas flowing through the discharge channel, and the coupling pipe (94, 94a, 94b) configured to couple the humidifier and the gas liquid separator together and guide, to the inlet, the oxygen-containing exhaust gas discharged from the humidifier, and the humidifier may be provided at the end of the fuel cell stack, and the gas liquid separator may be mounted to the humidifier through the coupling pipe.

The fuel cell system may include the bypass channel (70) for guiding, to the first channel, at least part of the oxygen-containing gas flowing through the supply channel.

In the fuel cell system, the inlet may be oriented toward the wall forming the first channel.

In the fuel cell system, the discharge channel may include the outlet channel (131) for allowing the oxygen-containing exhaust gas discharged from the outlet to flow downward.

In the fuel cell system, the regeneration apparatus (84) for regenerating energy of the oxygen-containing exhaust gas may be provided in the discharge channel on the downstream side of the gas liquid separator.

In the fuel cell system, the cross sectional area of the second channel may be larger than the cross sectional area of the first channel.

In the fuel cell system, the wall forming the first bent channel may include the separation wall (124) upon which the oxygen-containing exhaust gas guided from the first channel impinges, and the separation wall may extend in a vertical direction.

In the fuel cell system, the wall forming the second bent channel may include the separation wall (126) upon which the oxygen-containing exhaust gas guided from the upward flow channel impinges, and the separation wall may extend in a horizontal direction.

In the fuel cell system, the first channel may include a bent portion bent in a horizontal direction.

What is claimed is:

1. A fuel cell system comprising:
a fuel cell stack comprising a plurality of power generation cells stacked together in a stacking direction, the power generation cells each being configured to perform power generation by electrochemical reactions of a fuel gas and an oxygen-containing gas;
a supply channel configured to supply the oxygen-containing gas to the fuel cell stack;
a discharge channel through which an oxygen-containing exhaust gas discharged from the fuel cell stack flows; and
a gas liquid separator provided in the discharge channel and configured to perform gas liquid separation of the oxygen-containing exhaust gas,
wherein the gas liquid separator comprises:
a first channel configured to allow the oxygen-containing exhaust gas to flow in a horizontal direction;
a second channel connected to the first channel;
an inlet configured to guide the oxygen-containing exhaust gas into the first channel; and
an outlet configured to discharge the oxygen-containing exhaust gas flowing through the second channel, and
wherein the second channel comprises:
a first bent channel configured to guide upward the oxygen-containing exhaust gas guided from the first channel;
an upward flow channel configured to allow the oxygen-containing exhaust gas guided from the first bent channel to flow upward; and
a second bent channel configured to guide, in the horizontal direction, the oxygen-containing exhaust gas guided from the upward flow channel,
wherein a wall forming the first bent channel includes a separation wall upon which the oxygen-containing exhaust gas guided from the first channel impinges, the separation wall being configured to allow the oxygen-containing exhaust gas to flow upward, and
wherein the oxygen-containing exhaust gas led into the first bent channel and the oxygen-containing exhaust gas led out from the second bent channel flow into mutually opposite direction.

2. The fuel cell system according to claim 1, wherein the gas liquid separator is supported at an end of the fuel cell stack in the stacking direction of the plurality of power generation cells.

3. The fuel cell system according to claim 2, further comprising:
a humidifier configured to humidify the oxygen-containing gas flowing through the supply channel, by the oxygen-containing exhaust gas flowing through the discharge channel; and
a coupling pipe configured to couple the humidifier and the gas liquid separator together and guide, to the inlet, the oxygen-containing exhaust gas discharged from the humidifier, wherein
the humidifier is provided at the end of the fuel cell stack, and
the gas liquid separator is mounted to the humidifier through the coupling pipe.

4. The fuel cell system according to claim 1, wherein the inlet is oriented toward a wall forming the first channel.

5. The fuel cell system according to claim 1, wherein a regeneration apparatus configured to regenerate energy of the oxygen-containing exhaust gas is provided in the discharge channel on a downstream side of the gas liquid separator.

6. The fuel cell system according to claim 1, wherein a cross sectional area of the second channel is larger than a cross sectional area of the first channel.

7. The fuel cell system according to claim 1, wherein the separation wall extends in a vertical direction.

8. The fuel cell system according to claim 1, wherein
the separation wall comprises a first separation wall,
a wall forming the second bent channel includes a second separation wall upon which the oxygen-containing exhaust gas guided from the upward flow channel impinges, and
the second separation wall extends in the horizontal direction.

9. The fuel cell system according to claim 1, wherein the first channel includes a bent portion bent in the horizontal direction.

10. A fuel cell system comprising:
a fuel cell stack comprising a plurality of power generation cells stacked together in a stacking direction, the power generation cells each being configured to perform power generation by electrochemical reactions of a fuel gas and an oxygen-containing gas;
a supply channel configured to supply the oxygen-containing gas to the fuel cell stack;
a discharge channel through which an oxygen-containing exhaust gas discharged from the fuel cell stack flows; and
a gas liquid separator provided in the discharge channel and configured to perform gas liquid separation of the oxygen-containing exhaust gas,
wherein the gas liquid separator comprises:
a first channel configured to allow the oxygen-containing exhaust gas to flow in a horizontal direction;
a second channel connected to the first channel;
an inlet configured to guide the oxygen-containing exhaust gas into the first channel; and
an outlet configured to discharge the oxygen-containing exhaust gas flowing through the second channel, and
wherein the second channel comprises:
a first bent channel configured to guide upward the oxygen-containing exhaust gas guided from the first channel,
the fuel cell system further comprises a bypass channel configured to guide, to the first channel, at least part of the oxygen-containing gas flowing through the supply channel.

11. A fuel cell system comprising:
a fuel cell stack comprising a plurality of power generation cells stacked together in a stacking direction, the power generation cells each being configured to perform power generation by electrochemical reactions of a fuel gas and an oxygen-containing gas;
a supply channel configured to supply the oxygen-containing gas to the fuel cell stack;
a discharge channel through which an oxygen-containing exhaust gas discharged from the fuel cell stack flows; and
a gas liquid separator provided in the discharge channel and configured to perform gas liquid separation of the oxygen-containing exhaust gas,
wherein the gas liquid separator comprises:
a first channel configured to allow the oxygen-containing exhaust gas to flow in a horizontal direction;
a second channel connected to the first channel;
an inlet configured to guide the oxygen-containing exhaust gas into the first channel; and
an outlet configured to discharge the oxygen-containing exhaust gas flowing through the second channel, and
wherein the second channel comprises:
a first bent channel configured to guide upward the oxygen-containing exhaust gas guided from the first channel,
wherein the discharge channel includes an outlet channel configured to allow the oxygen-containing exhaust gas discharged from the outlet to flow downward.

* * * * *